United States Patent
Chang

(10) Patent No.: US 9,348,779 B2
(45) Date of Patent: May 24, 2016

(54) MULTIFUNCTIONAL ELECTRONIC APPARATUS FOR CHARGING ELECTRONIC PRODUCT

(71) Applicant: Nai-Chien Chang, New Taipei (TW)

(72) Inventor: Nai-Chien Chang, New Taipei (TW)

( * ) Notice: Subject to any disclaimer, the term of this patent is extended or adjusted under 35 U.S.C. 154(b) by 237 days.

(21) Appl. No.: 14/044,439

(22) Filed: Oct. 2, 2013

(65) Prior Publication Data

US 2014/0111934 A1 Apr. 24, 2014

(30) Foreign Application Priority Data

Oct. 23, 2012 (TW) .............................. 101220402 A

(51) Int. Cl.
*G06F 1/16* (2006.01)
*H05K 5/00* (2006.01)
*H05K 7/00* (2006.01)
*G06F 13/38* (2006.01)

(52) U.S. Cl.
CPC .............. *G06F 13/38* (2013.01); *G06F 13/382* (2013.01)

(58) Field of Classification Search
CPC ..... G06F 13/38; G06F 1/1632; G06F 1/1628; G06F 1/266; H02J 7/0054; H02J 7/0027
USPC .............................. 361/679.4, 679.41, 679.45
See application file for complete search history.

(56) References Cited

U.S. PATENT DOCUMENTS

| | | | | |
|---|---|---|---|---|
| 2008/0096620 | A1* | 4/2008 | Lee ........................ | G06F 1/1626 455/575.8 |
| 2008/0278899 | A1* | 11/2008 | Hotelling .............. | G06F 1/1632 361/679.41 |
| 2010/0195279 | A1* | 8/2010 | Michael ................ | G06F 1/1632 361/679.41 |
| 2013/0222991 | A1* | 8/2013 | McWilliams .......... | G06F 1/1632 361/679.4 |
| 2014/0146464 | A1* | 5/2014 | Abdelsamie .......... | G06F 1/1628 361/679.41 |

\* cited by examiner

*Primary Examiner* — Bernard Rojas
(74) *Attorney, Agent, or Firm* — Chun-Ming Shih; HDLS IPR Services

(57) ABSTRACT

A multifunctional electronic apparatus includes a casing, a connection port group integrated with the casing, a memory card slot group, an operation interface, a power input element, a wireless antenna, a first storage element, an output element, a second storage element and a control circuit. The multifunctional electronic apparatus is a base station for wirelessly connecting to the Internet, and has reading memory cards, storing data, supplying power, charging and playing data functions.

14 Claims, 4 Drawing Sheets

MULTIFUNCTIONAL ELECTRONIC APPARATUS FOR CHARGING ELECTRONIC PRODUCT

BACKGROUND OF THE INVENTION

1. Field of the Invention

The present invention relates to an electronic apparatus, and especially relates to a multifunctional electronic apparatus having wireless AP, storing, wireless playing, power bank and wireless charging functions.

2. Description of the Related Art

A computer has to be connected to a modem if a user wants to surf the Internet by the computer. The computer can send data to a far end or receive data from the far end through the Internet. In the early stage, the modem can be connected to a single computer only. A lot of the modems are required if a lot of the computers are connected to the Internet. This will cost a lot, and the installation is troublesome as well. In order to solve the above-mentioned problem, the wire or wireless AP routers are invented. A lot of the computers or electronic products can be connected to the Internet through the wire or wireless AP router after the wire or wireless AP router is connected to a modem. Therefore, only one modem is required, and the above-mentioned problem is solved.

In the recent years, the technology is progressing every day. Many portable electronic products have a lot of functions and application software. A high operating speed microprocessor is required to process the functions and the application software. Power consumption is high when the microprocessor works in high operating speed. Therefore, capacity of a battery of the electronic product is enlarged and a charger for charging by a wall socket power is portable. A power bank is used for charging if the wall socket power is not available. The electronic product can be charged everywhere by the power bank.

Usually, peripheral equipment of the electronic product cannot be used by the other electronic products. Therefore, bringing out a lot of electronic products is inconvenient if the peripheral equipment of each of the electronic products is brought out as well.

SUMMARY OF THE INVENTION

In order to solve the above-mentioned problems, an object of the present invention is to provide a multifunctional electronic apparatus having wireless AP, storing, wireless playing, power bank and wireless charging functions. The multifunctional electronic apparatus is convenient for bringing out.

In order to achieve the object of the present invention mentioned above, the multifunctional electronic apparatus can be wire or wireless connected to an electronic product and can charge the electronic product. The multifunctional electronic apparatus includes a casing, a connection port group, a memory card slot group, a wireless antenna, a first storage element and a second storage element. A placing area is on a surface of the casing. A control circuit is arranged inside the casing. The control circuit at least includes an electromagnetic conversion unit. The connection port group includes a plurality of connection ports. Each of the connection ports is assembled to the casing and is electrically connected to the control circuit. The memory card slot group includes a plurality of memory card slots with different specifications. Each of the memory card slots is assembled to the casing and is electrically connected to the control circuit. The wireless antenna is assembled to the casing and electrically connected to the control circuit. The first storage element is arranged inside the casing and is electrically connected to the control circuit. The second storage element is arranged inside the casing and is electrically connected to the control circuit. Moreover, the control circuit is configured to control the multifunctional electronic apparatus to connect to the Internet. The control circuit is configured to store a multimedia data into the second storage element or play the multimedia data. The control circuit is configured to control the first storage element to charge or discharge. The control circuit is configured to drive the electromagnetic conversion unit to wireless charge the electronic product.

Moreover, the casing is made of plastic.

Moreover, the connection port is one of a universal serial bus (USB), a mini USB, a micro USB, a high definition multimedia interface (HDMI), a displayport, an external serial advance technology attachment (eSATA), a video graphics array (VGA), an RJ-45 and a 3.5 mm earphone jack.

Moreover, the memory card slot is one of a secure digital (SD) memory card slot, a mini SD memory card slot, a micro SD memory card slot and a compact flash (CF) memory card slot.

Moreover, the first storage element is a rechargeable battery.

Moreover, the second storage element is a memory or a hard disk.

Moreover, the control circuit further includes a micro processing unit, a wireless transceiver and a charging-discharging circuit. The micro processing unit is electrically connected to the connection port group, the memory card slot group, the first storage element and the second storage element. The micro processing unit is configured to transmit and output data through the connection port group, the memory card slot group and the second storage element. The micro processing unit is configured to store the data into the second storage element. The wireless transceiver is electrically connected to the micro processing unit and the wireless antenna. The wireless transceiver and the micro processing unit are configured to process signals received by the wireless antenna and are configured to connect to the Internet. The charging-discharging circuit is electrically connected to the micro processing unit. The micro processing unit is configured to control the charging-discharging circuit to charge or discharge the first storage element.

Moreover, the electromagnetic conversion unit is electrically connected to the micro processing unit and is arranged inside the casing and is corresponding to the placing area.

Moreover, the electromagnetic conversion unit is a coil.

Moreover, the multifunctional electronic apparatus further includes an operation interface. The operation interface includes a plurality of press buttons. The operation interface is arranged on the casing and is electrically connected to the control circuit.

Moreover, the multifunctional electronic apparatus further includes a power input element electrically connected to a power converter. The power input element receives a direct current power which is outputted from the power converter.

Moreover, the power input element is a direct current jack.

Moreover, the multifunctional electronic apparatus further includes an output element. The output element is arranged inside the casing and is electrically connected to the control circuit. The control circuit is configured to drive the output element to output audio signals.

Moreover, the output element is a speaker.

DETAILED DESCRIPTION OF THE INVENTION

Figure 1:
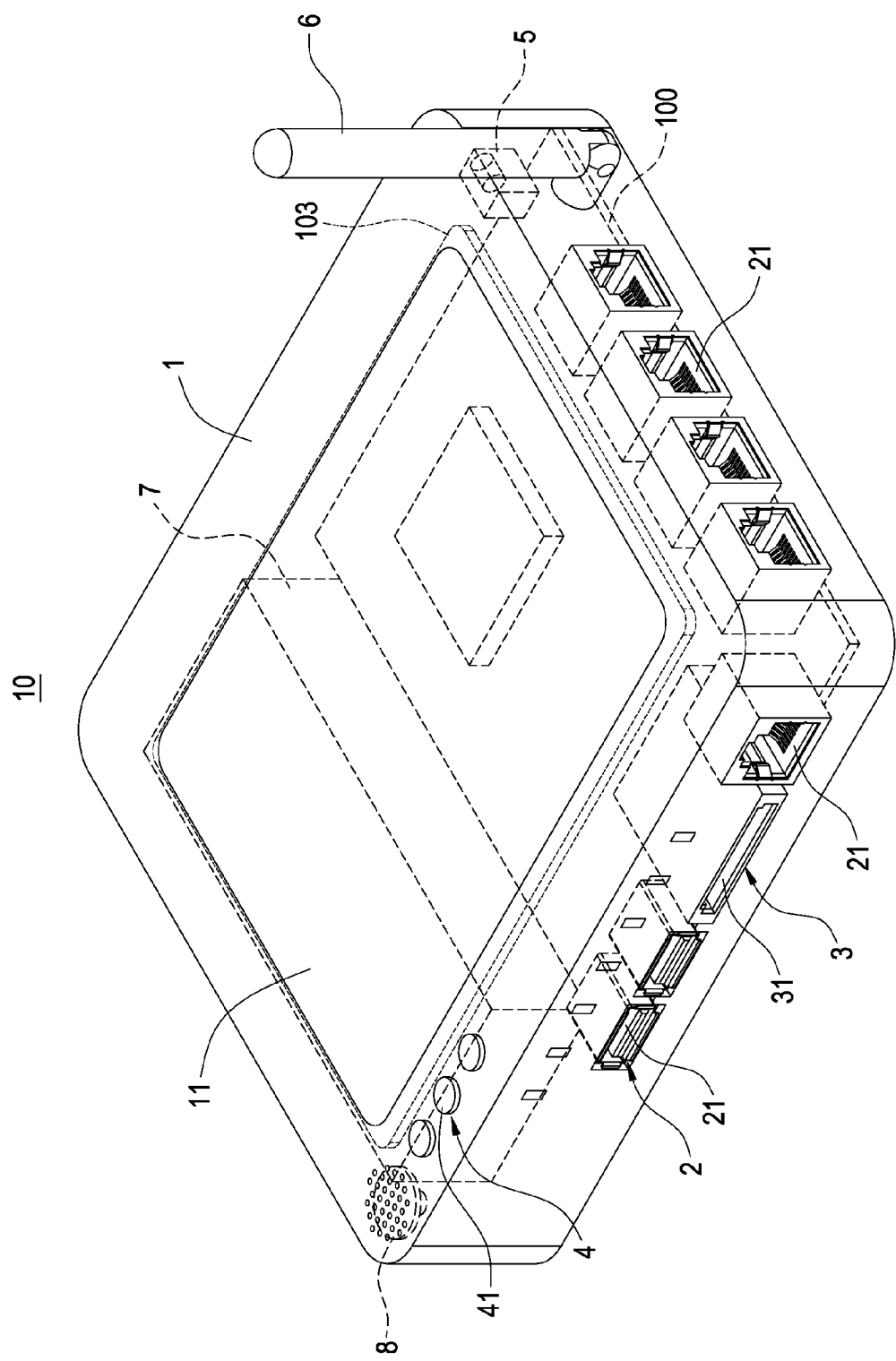
FIG. 1 shows a perspective view of a multifunctional electronic apparatus of the present invention.

FIG. 1 shows a perspective view of a multifunctional electronic apparatus of the present invention. The multifunctional electronic apparatus 10 includes a casing 1, a connection port group 2, a memory card slot group 3, an operation interface 4, a power input element 5, a wireless antenna 6, a first storage element 7, an output element 8, a second storage element 9 and a control circuit 100.

The casing 1 is made of plastic. A placing area 11 is on a surface of the casing 1. The control circuit 100 is arranged inside the casing 1. A user may put an electronic product which has the wireless charging function (such as a smart phone, a tablet PC, an ipad, an ipod, a notebook, an electric shaver, an electric toothbrush or a power bank) on the placing area 11.

The connection port group 2 includes a plurality of connection ports 21. Each of the connection ports 21 is assembled to the casing 1 and is electrically connected to the control circuit 100. The connection ports 21 are used to connect to various transmission line connectors (not shown in FIG. 1) for transmitting/receiving data or power. The connection port 21 is one of a universal serial bus (USB), a mini USB, a micro USB, a high definition multimedia interface (HDMI), a displayport, an external serial advance technology attachment (eSATA), a video graphics array (VGA), an RJ-45 and a 3.5 mm earphone jack.

The memory card slot group 3 includes a plurality of memory card slots 31 with different specifications. Each of the memory card slots 31 is assembled to the casing 1 and is electrically connected to the control circuit 100. The memory card slots 31 are used to connect to various transmission line connectors or memory cards (not shown in FIG. 1). The memory card slot 31 is one of a secure digital (SD) memory card slot, a mini SD memory card slot, a micro SD memory card slot and a compact flash (CF) memory card slot.

The operation interface 4 includes a plurality of press buttons 41. The operation interface 4 is arranged on the casing 1 and electrically connected to the control circuit 100. The operation interface 4 is used for inputting various operation signals for connecting to the Internet, setting or playing.

The power input element 5 is electrically connected to the control circuit 100 and an external power converter (not shown in FIG. 1). The control circuit 100 receives power from the external power converter through the power input element 5. The power input element 5 is a direct current jack.

The wireless antenna 6 is assembled to the casing 1 and is electrically connected to the control circuit 100. An electronic product (not shown in FIG. 1) is connected to the Internet through the wireless antenna 6. Therefore, the multifunctional electronic apparatus 10 is used as a wireless AP base station.

The first storage element 7 is arranged inside the casing 1 and is electrically connected to the control circuit 100. The first storage element 7 is charged by the control circuit 100. The direct current power is stored in the first storage element 7 as a power bank. The first storage element 7 is a rechargeable battery.

The output element 8 is arranged inside the casing 1 and is electrically connected to the control circuit 100. The control circuit 100 is configured to drive the output element 8 to output audio signals. The output element 8 is a speaker.

The second storage element 9 is arranged inside the casing 1 and is electrically connected to the control circuit 100. The second storage element 9 is used to store multimedia data, such as pictures, music or application programs. The second storage element 9 is a memory or a hard disk.

Figure 2:
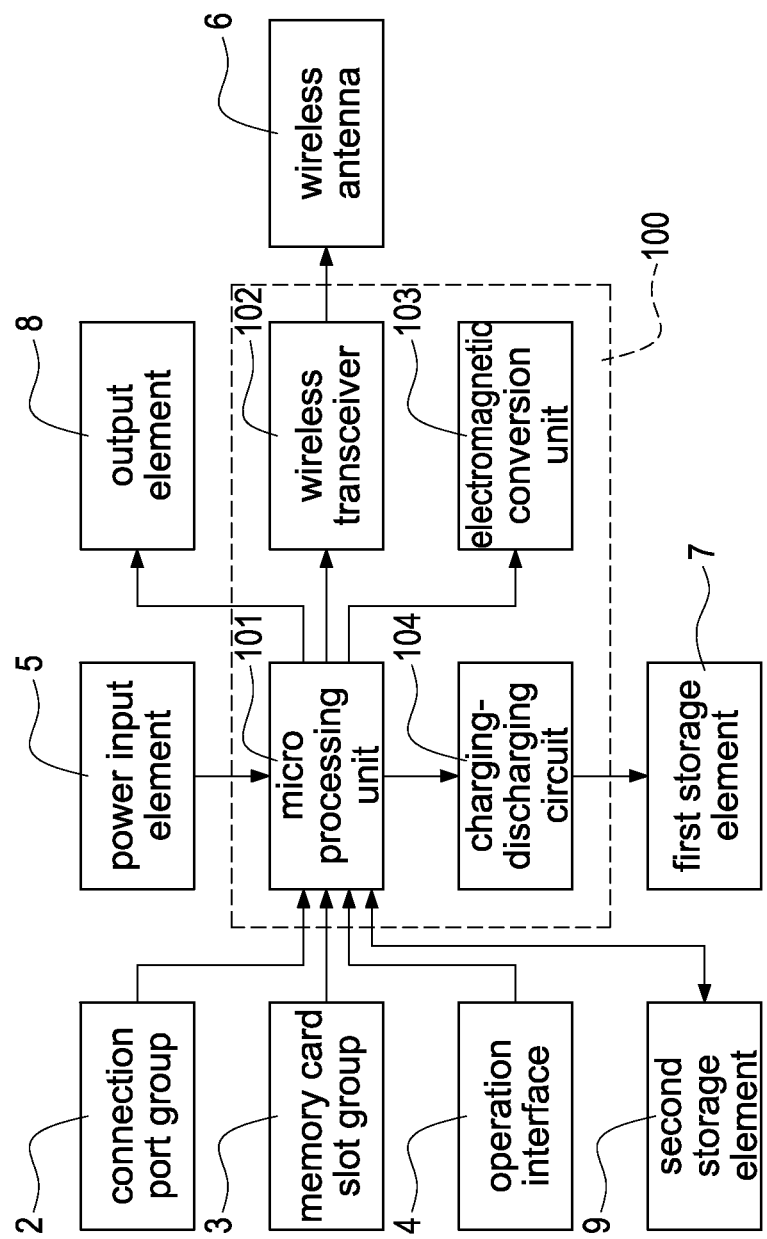
FIG. 2 shows a block diagram of a control circuit of the present invention.

FIG. 2 shows a block diagram of the control circuit of the present invention. The control circuit 100 includes a micro processing unit 101, a wireless transceiver 102, an electromagnetic conversion unit 103 and a charging-discharging circuit 104.

The micro processing unit 101 is electrically connected to the connection port group 2, the memory card slot group 3, the operation interface 4, the power input element 5, the first storage element 7, the output element 8 and the second storage element 9. The micro processing unit 101 is configured to transmit and output data according to the commands which are received by the micro processing unit 101. The micro processing unit 101 is configured to store the data into the second storage element 9.

The wireless transceiver 102 is electrically connected to the micro processing unit 101 and the wireless antenna 6. The micro processing unit 101 is connected to the modem for connecting to the Internet after the signals received by the wireless antenna 6 are processed by the wireless transceiver 102 and the micro processing unit 101. Moreover, the signals sent from the Internet are transmitted from the wireless antenna 6 to the electronic product.

The electromagnetic conversion unit 103 is electrically connected to the micro processing unit 101 and is arranged inside the casing 1 and is corresponding to the placing area 11. The electromagnetic conversion unit 103 converts the electric power which is outputted from the micro processing unit 101 into magnetic force. Then, the magnetic force is induced by an electromagnetic induction coil which is arranged inside another electronic product (not shown in FIG. 2). The magnetic force is converted into electric power for charging a rechargeable battery of the electronic product. The electromagnetic conversion unit 103 is a coil.

The charging-discharging circuit 104 is electrically connected to the micro processing unit 101. The micro processing unit 101 is configured to control the charging-discharging circuit 104 to charge or discharge the first storage element 7.

Figure 3:
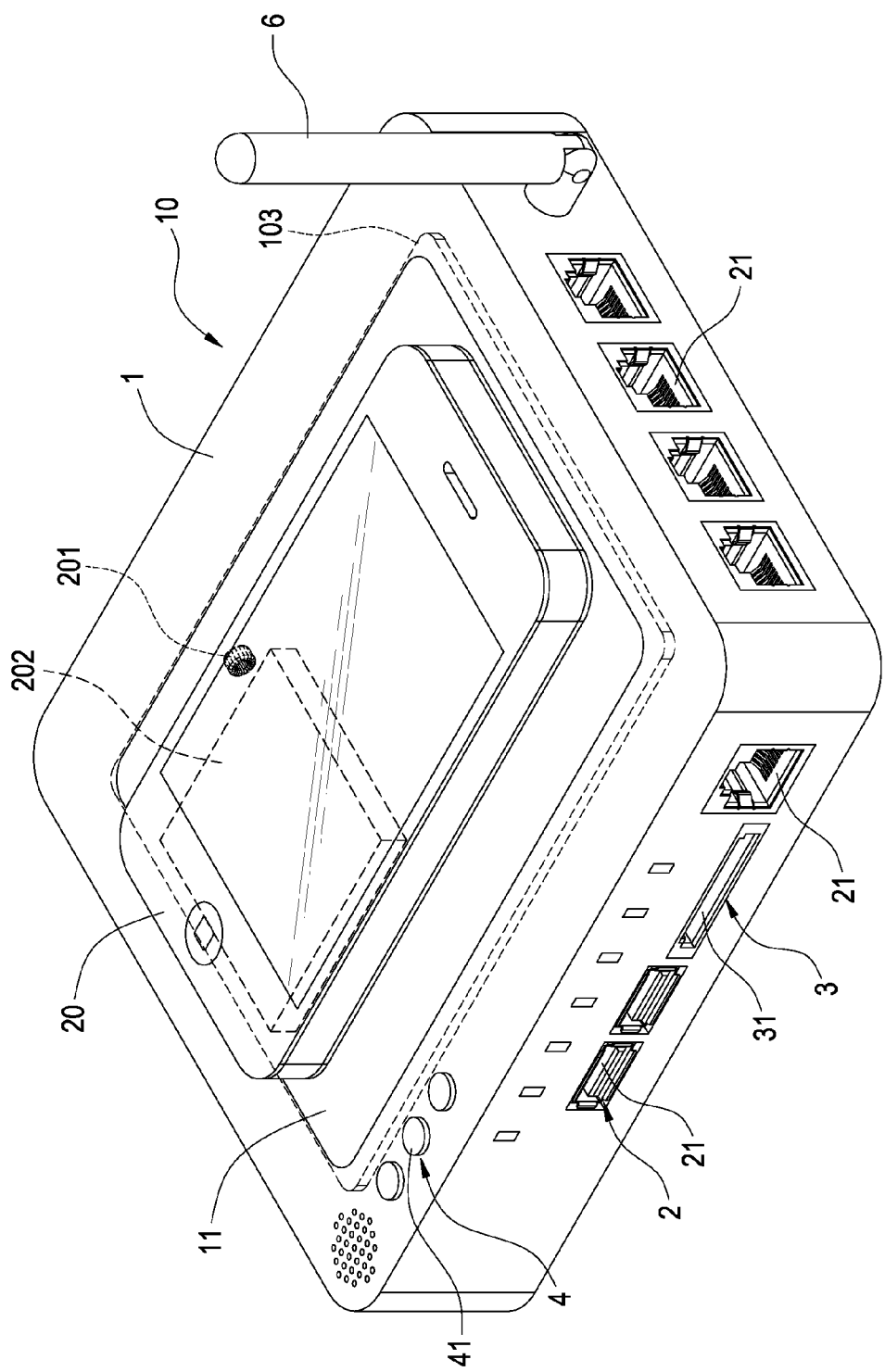
FIG. 3 shows a schematic diagram that an electronic product is arranged on the multifunctional electronic apparatus of the present invention for charging.
Figure 4:
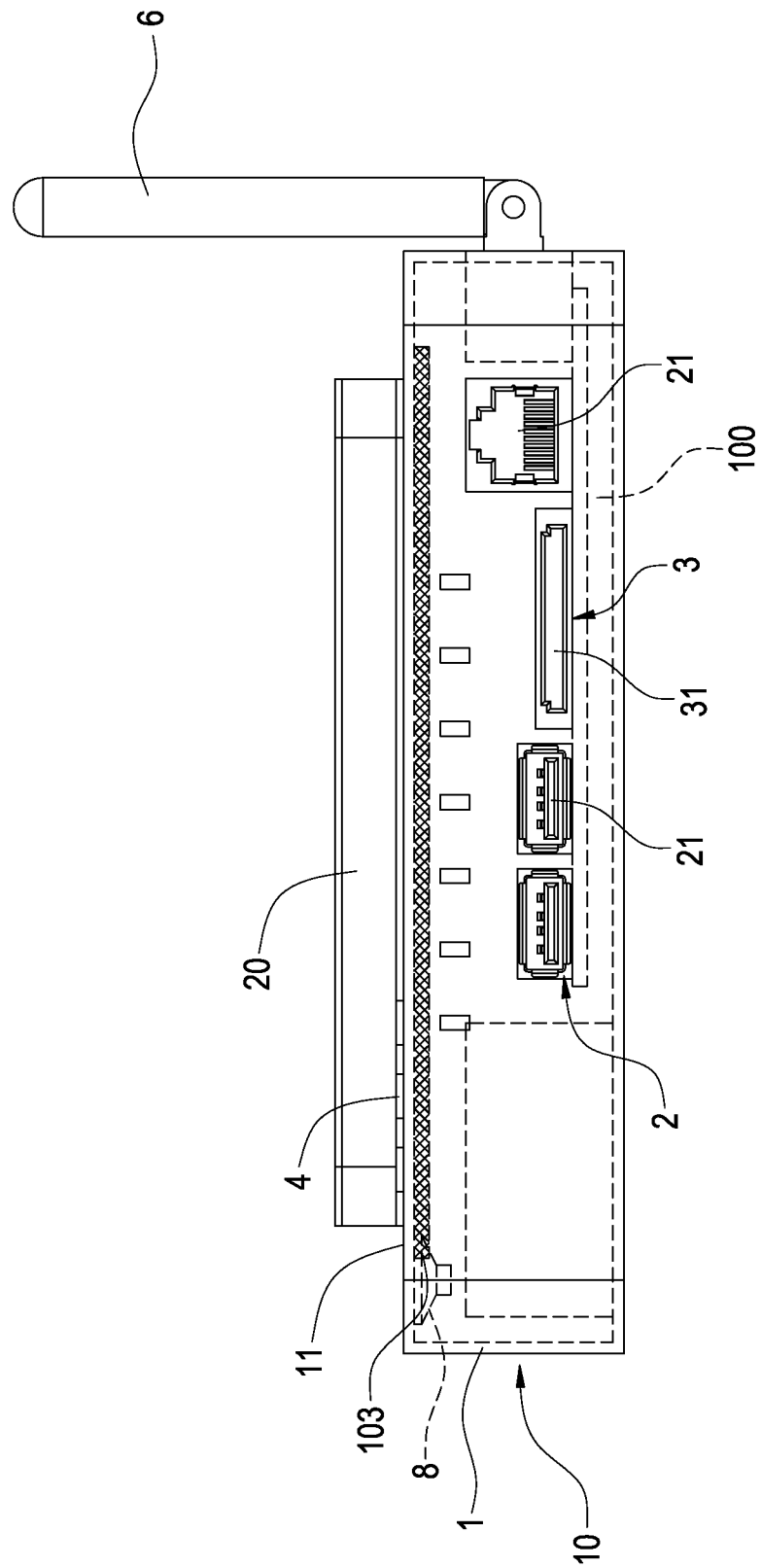
FIG. 4 shows a side view that the electronic product is arranged on the multifunctional electronic apparatus of the present invention for charging.

FIG. 3 shows a schematic diagram that an electronic product is arranged on the multifunctional electronic apparatus of the present invention for charging. FIG. 4 shows a side view that the electronic product is arranged on the multifunctional electronic apparatus of the present invention for charging. The electronic apparatus 10 is electrically connected to a modem (not shown in FIGS. 3 and 4). The wireless rechargeable electronic product 20 (such as a smart phone, a tablet PC, an ipad, an ipod, an electric shaver, an electric toothbrush or a power bank) is put on the placing area 11 when requiring charging. The micro processing unit 101 drives the electromagnetic conversion unit 103 for converting the electric power into magnetic force. The magnetic force is transmitted to the electronic product 20. Then, the magnetic force is induced by an electromagnetic induction winding 201 which is arranged inside the electronic product 20. The magnetic force is converted into electric power for charging a rechargeable battery 202 of the electronic product 20.

A network cable (not shown in FIGS. 3 and 4) is connected to the connection port 21 (RJ-45). Then, the electronic apparatus 10 is connected to the Internet through the modem.

The electronic product 20 is connected to the connection port 21 (USB, mini USB, micro USB or eSATA) through a transmission line (not shown in FIGS. 3 and 4). Then, by operating the operation interface 4, the data stored in the electronic product 20 is transmitted to the second storage element 9 for storing by the micro processing unit 101.

The electronic product 20 is connected to the connection port 21 (USB, mini USB, or micro USB) through a transmission line (not shown in FIGS. 3 and 4). The micro processing unit 101 drives the charging-discharging circuit 104 to control the first storage element 7 to charge the electronic product 20 when the micro processing unit 101 judges that the power of the electronic product 20 is low. The electric power is sent through the USB, the mini USB, or the micro USB to the electronic product 20.

A WiFi antenna of the electronic product 20 is wirelessly connected to the wireless antenna 6 of the electronic apparatus 10. Then, the electronic product 20 is connected to the Internet after processing by the wireless transceiver 102 and the micro processing unit 101 and connecting to the modem. Moreover, by operating the operation interface 4, the data stored in the electronic product 20 is transmitted to the second storage element 9. Moreover, the multimedia music stored in the electronic product 20 would be played.

By operating the operation interface 4, the micro processing unit 101 reads or the output element 8 plays the data stored in a memory card (SD, mini SD or CF memory card) which is plugged into the memory card slot group 3.

The electronic product 20 is connected to the Internet through the multifunctional electronic apparatus 10. The multimedia data is stored in the second storage element 9 or played. The first storage element 7 is charged or discharged. The electromagnetic conversion unit 103 is driven to wirelessly charge the electronic product 20.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multifunctional electronic apparatus in wired or wireless connection to an electronic product and charging the electronic product, the multifunctional electronic apparatus comprising:
a casing, a placing area arranged on a surface of the casing, a control circuit arranged inside the casing, the control circuit at least comprising an electromagnetic conversion unit;
a connection port group comprising a plurality of connection ports, each of the connection ports assembled to the casing and electrically connected to the control circuit;
a memory card slot group comprising a plurality of memory card slots with different specifications, each of the memory card slots assembled to the casing and electrically connected to the control circuit;
a wireless antenna assembled to the casing and electrically connected to the control circuit;
a first storage element arranged inside the casing and electrically connected to the control circuit; and
a second storage element arranged inside the casing and electrically connected to the control circuit,
wherein the control circuit is configured to control the multifunctional electronic apparatus to connect to an internet; the control circuit is configured to store a multimedia data in the second storage element, or play the multimedia data; the control circuit is configured to charge or discharge the first storage element; the control circuit is configured to drive the electromagnetic conversion unit to wirelessly charge the electronic product.

2. The multifunctional electronic apparatus in claim 1, wherein the casing is made of plastic.

3. The multifunctional electronic apparatus in claim 2, wherein one of the connection ports is a universal serial bus (USB), a mini USB, a micro USB, a high definition multimedia interface (HDMI), a displayport, an external serial advance technology attachment (eSATA), a video graphics array (VGA), an RJ-45 or a 3.5 mm earphone jack.

4. The multifunctional electronic apparatus in claim 3, wherein one of the memory card slots is a secure digital (SD) memory card slot, a mini SD memory card slot, a micro SD memory card slot or a compact flash (CF) memory card slot.

5. The multifunctional electronic apparatus in claim 4, wherein the first storage element is a rechargeable battery.

6. The multifunctional electronic apparatus in claim 5, wherein the second storage element is a memory or a hard disk.

7. The multifunctional electronic apparatus in claim 6, wherein the control circuit further comprises:
a micro processing unit electrically connected to the connection port group, the memory card slot group, the first storage element and the second storage element, the micro processing unit configured to transmit and output data through the connection port group, the memory card slot group and the second storage element, or the micro processing unit configured to store the data into the second storage element;
a wireless transceiver electrically connected to the micro processing unit and the wireless antenna, the wireless transceiver and the micro processing unit configured to process signals received by the wireless antenna and configured to connect to the internet; and
a charging-discharging circuit electrically connected to the micro processing unit, the micro processing unit configured to control the charging-discharging circuit to charge or discharge the first storage element.

8. The multifunctional electronic apparatus in claim 7, wherein the electromagnetic conversion unit is electrically connected to the micro processing unit and is arranged inside the casing and is corresponding to the placing area.

9. The multifunctional electronic apparatus in claim 8, wherein the electromagnetic conversion unit is a coil.

10. The multifunctional electronic apparatus in claim 9, further comprising an operation interface, the operation interface comprising a plurality of press buttons, the operation interface arranged on the casing and electrically connected to the control circuit.

11. The multifunctional electronic apparatus in claim 10, further comprising a power input element arranged within the casing and electrically connected to a power converter, the power input element receiving a direct current power outputted from the power converter.

12. The multifunctional electronic apparatus in claim 11, wherein the power input element is a direct current jack.

13. The multifunctional electronic apparatus in claim 12, further comprising an output element arranged inside the casing and electrically connected to the control circuit, the control circuit configured to drive the output element to output audio signals.

14. The multifunctional electronic apparatus in claim 13, wherein the output element is a speaker.

\* \* \* \* \*